3,089,828
Patented May 14, 1963

3,089,828
EVALUATION OF PROTEOLYTIC ENZYME ACTIVITY

Andrew G. Tsuk, Yonkers, N.Y., assignor to Schwarz Bioresearch, Inc., Mount Vernon, N.Y., a corporation of New York
No Drawing. Filed Dec. 27, 1960, Ser. No. 78,308
3 Claims. (Cl. 195—103.5)

This invention relates to new and useful improvements in the evaluation of enzyme activity.

Measurements and evaluation of enzyme activity are necessary for various purposes as, for example, the control and regulation of industrial enzymatic processes and the production of enzyme products, and for various medical tests. The conventional modes of measuring enzyme activity are relatively cumbersome and complicated and generally suffer in accuracy caused by an accumulation of reaction products during the measurement which can affect the activity of the enzyme. The temperatures at which the measurements may be taken are controlled and limited by the characteristics of the test media, so that very often it is not possible to make the measurements at all the temperatures which might be desired.

One object of this invention is a novel method for evaluating enzyme activity which overcomes the above mentioned disadvantages and which allows a simple and direct measurement with very little special instrumentation.

These and still further objects will become apparent from the following description.

In accordance with the invention the enzyme activity is evaluated by maintaining a solid body of a polymer which is insoluble in the liquid enzyme material to be evaluated but capable of being degraded to a soluble product by the enzyme activity in contact with the liquid enzyme material, and measuring the change in the physical dimensions of the body as a function of time.

The solid polymer body may be any homogeneous solid polymer which is not soluble in the enzyme or enzyme solution being measured, but the chemical bonds of which are subject to attack by the enzyme activity so as to degrade, i.e., reduce the apparent molecular weight of the polymer, converting the same to a form soluble in the enzyme material.

I have discovered that many solid polymers which are subject to enzyme attack may be rendered insoluble without a loss in their susceptibility to the enzyme attack by cross-linking the polymer with a small number of cross-linking bonds. Thus, for example, soluble natural polymers rendered insoluble by artificial cross-linking have proven preferable. The degree of cross-linking may be very easily empirically determined by, for example, determining the lower limit at which the polymer is first rendered insoluble and the upper limit, if such limit exists, at which the polymer will no longer be subjected to cleavage by enzyme attack.

Examples of such polymers which may be used in accordance with the invention include thiolated gelatin cross-linked in an alkaline pH by the formation of disulfide cross-linking bonds which is particularly suitable for evaluating the activity of proteolytic enzymes, such as trypsin, pepsin, chymotrypsin, etc.; cross-linked starch as, for example, is produced from water-soluble starch by periodate iodate oxidation, which is particularly suitable for evaluating alpha and beta amylase activity; the cross-linked nucleic acid gel as prepared from a high molecular weight thymus nucleic acid, as for example having a molecular weight of about 6,000,000, which is particularly valuable for evaluating deoxyribonuclease, and polymers cross-linked by means of ester groups, such as polyacrylic acid-ethylene glycol polymers, which are particularly suitable for evaluating the enzyme esterase.

The cross-linked polymers may be capable of degradation by the enzyme material through a splitting of the regular polymer chain bond and/or the cross links. The solid polymer body is preferably formed into a given geometric shape as, for example, a block or cube shape or the like, and immersed in the enzyme material, such as a solution of the enzyme under controlled conditions of temperature, pH, enzyme concentration and the like, and the change in the linear dimension is noted as a function of time. Thus, for example, the decrease in the length of the edge of a cube may be noted as a function of time. As the polymer is insoluble in the enzyme material and does not permit penetration thereof, the action of the enzyme is solely restricted to the surface of the polymer, so that the polymer substrate, as a result of the enzyme activity, becomes reduced in size without a change in shape. Thus a cube or block uniformly becomes reduced in size and this reduction of size may be measured, for example, by measuring the length of an edge. If the polymer is in the form of a sphere, for example, reduction in size may be measured by a change in the diameter.

The rate at which the change in size occurs has been found to depend on the inherent characteristics of the polymer, such as the concentration and degree of cross-linking of a cross-linked gel, on the temperature, pH of the medium, and on the enzyme activity. For any given type of polymer therefore if the temperature and pH are maintained constant, the change in size will solely occur as a function of the enzyme activity, and may be used to directly measure such activity as, for example, by comparison against the same measurements made with an enzyme of known activity. If the decrease in the linear dimensions of a polymer is plotted on a graph as a function of time, the resulting plot is in the form of a straight line of a given slope. If this line slope for an enzyme of a standard known activity is plotted under given conditions, the activity of any other enzyme of unknown activity may be compared and accurately measured by determining its corresponding line slope under similar conditions and comparing the same to the slope of the standard.

The change in the linear dimensions of the polymer may be determined from any known or conventional instruments for measuring length. Thus, for example, extremely accurate measurements may be carried out, using a micrometer caliper. The linear dimensions may also be measured by any other known or conventional manner as, for example, by measuring the electric resistance, across the length thereof, at the start of the measurement and at given intervals of time by contacting opposite ends with electrodes, or by embedding an electrode, such as a platinum electrode, into the polymer and placing another electrode in the solution in order to determine a decrease in the electrical resistance as a function of time. Such electrode measurements may be continuously made and recorded automatically.

It is also possible to measure the change in the physical dimensions by measuring the change in mass as, for example, by periodically weighing the polymer which has been in contact with the enzyme. For any given initial polymer shape, the rate of change of the mass decreases with a decrease in the surface area, but the enzyme activity may, for example, easily be determined by determining the actual change in mass in a given period of time and comparing it with the change in mass over a similar period of time caused by contact with an enzyme of known activity. The change in the physical dimensions may also be measured by noting the period of time in which it takes a body of a given size, as for example a sphere, to completely disappear in a solution of the enzyme, and comparing the same with the time required for the same size body, such as a sphere, to disappear in an enzyme of known activities under the same conditions. The invention therefore allows the measurement of enzyme activity to be based on the most accurate, reliable and simple type of measurements known, and avoids the tedious chemical analyses with the inherent errors attached thereto which were previously required. Furthermore, in accordance with the invention, it becomes possible and feasible to market a standardized polymer substrate of a given geometric shape, which need merely be placed by the user in the enzyme solution at a given temperature and pH in order to effect the enzyme activity measurement by noting the change in the size of the polymer body or some simple visible change dependent on such change of size over a given period of time.

The following examples are given by way of illustration and not limitation:

*Example 1*

A 5% aqueous solution of a thiolated gelatin containing 10 mercaptan groups per 100,000 grams of dry gelatin was allowed to set. The thiolated gelatin is sold under the name "Thiogel" by Schwarz BioResearch, Inc., of Mount Vernon, New York, and is obtained by reacting a solution of gelatin with an amount of triethylamine sufficient to bring the solution within the alkaline range of about 10.5–11, adding acetyl homocysteine thiolactone, acidifying to a pH between 3 and 3.5 with hydrochloric acid and precipitating from acetone at a low temperature between about −10° and −30° C. The pH of the thiolated gelatin gel was adjusted to 9.5 and allowed to stand in the air for two days, resulting in a solid body of the cross-linked gelatin. This gelatin was cut into a cube having a 2 centimeter edge. The cube was contacted with a 0.001% solution of trypsin at a pH of 7.6 at 36° C. As a result of this contacting the size of the cube gradually reduced without a change in shape, and the rate change of the size of the edge was measured at 2 millimeters per hour.

The activity of other trypsin solutions could be measured against this measurement, using identical cubes and noting the rate of change of the edge length. The same rate of change would indicate equal activity, a slower rate, a lesser activity, and a greater rate, a greater activity.

*Example 2*

Example 1 is repeated for the evaluation of the enzymes pepsin, chymotrypsin, papain, and reductases, and in each case the activity of a quantity of the enzyme of unknown activity could be measured and compared with the same enzyme of known activity, by comparing the rates of changes of the length of the edge of the cube.

*Example 3*

Water-soluble starch was cross-linked by periodate iodate oxidation and cut into cubes as described in Example 1. The rate of change in the length of the cube edge is measured in solutions of alpha and beta amylases and these rates compared against rates determined for the same enzyme of known activity.

*Example 4*

Example 3 was repeated, using in turn, a cross-linked nucleic acid gel prepared from a 6,000,000 molecular weight thymus nucleic acid sample, with the measurements made in a deoxyribonuclease enzyme solution and with cubes made from a cross-linked polyacrylic acid-ethylene glycol polymer, with measurements made in solutions of the enzyme esterase.

*Example 5*

A 10% aqueous solution of a thiolated gel prepared as described in Example 1 and in copending U.S. patent application Serial No. 26,429, filed May 3, 1960, containing 5 mercaptan groups per 100,000 grams of dry gelatin was formed into spheres of uniform size and allowed to set. The pH was raised to 9.5 and the gelatin was allowed to cross-link by standing in air for 2 days. Some of these spheres were then immersed in a 0.02% solution of papain activated with cysteine at a pH of 5.0 at a temperature of 40° C. The spheres completely disappeared after exactly 20 minutes. The same spheres could thus be used for evaluating the activity of a similar enzyme of unknown activity by noting the time required for disappearance of the spheres under the same conditions.

In view of the fact that the polymers, and particularly the cross-linked polymers used as substrates in accordance with the invention, are insoluble at high temperatures, it is possible to effect accurate enzyme measurements at optimum temperatures, such as 27°, 50° or 60° C., depending on the enzyme used. These cross-linked polymers, as for example the cross-linked thiolated gelatin, may remain insoluble in aqueous solution at temperatures as high as 100° C. whereas most other enzyme substrates will dissolve at elevated temperatures in the enzyme medium.

The accumulated reaction products do not adversely affect the measurements in accordance with the invention as the accumulated reaction products may be readily removed, for example by simple stirring, washing or the like, without influencing the enzyme activity measurements.

It will be recognized that there are many alternative methods for visualizing change in dimensions as, for example, by embedding dyes or pigments at a fixed distance below the surface of the solid substrate so that the system will change color when the enzyme action has proceeded sufficiently to release the coloring material into the surrounding medium; or by distributing coloring material uniformly through the solid polymer body and measuring the density of color in the enzyme medium after a given time.

While the invention has been described in detail with reference to certain specific embodiments, various changes and modifications which fall within the spirit of the invention will become apparent to the skilled artisan. The invention is therefore only intended to be limited by the appended claims or their equivalents wherein I have endeavored to claim all inherent novelty.

I claim:

1. Method for evaluating proteolytic enzyme activity which comprises maintaining a solid body of cross-linked thiolated gelatin in a liquid solution of the proteolytic enzyme to be evaluated, and measuring the change in the physical dimensions of said body as a function of time said thiolated gelatin having a sufficient degree of cross-linking with disulfide bonds to render the same insoluble in said liquid solution of the enzyme.

2. Method according to claim 1 in which said body has a predetermined geometric shape and in which the change in linear dimension of said body is measured as a function of time.

3. Method according to claim 2 in which said enzyme is a member selected from the group consisting of the proteolytic enzymes reductase, and papain.

References Cited in the file of this patent

Landis, "A Simple Method for the Approximate Estimation of Proteolytic Activity," Cereal Chem., May 1942, pages 419–422.

West and Todd, "Textbook of Biochemistry," publ. by MacMillan Co., May 1952, page 359.

Everett et al., "In Situ Histological Evaluation of Elastase Activity," Stain Technology, vol. 34, No. 6, Nov. 1959, pages 325–330.